United States Patent [19]

Escobosa

[11] Patent Number: 5,384,605
[45] Date of Patent: Jan. 24, 1995

[54] EYEGLASS RETAINER WITH SWEATBAND

[76] Inventor: David S. Escobosa, 2507 Katherine St., El Cajon, Calif. 92020

[21] Appl. No.: 15,313

[22] Filed: Feb. 9, 1993

Related U.S. Application Data

[63] Continuation of Ser. No. 664,942, Mar. 5, 1991, abandoned.

[51] Int. Cl.⁶ ............................................. G02C 5/14
[52] U.S. Cl. ................................ 351/123; 351/156; 351/157; 2/452
[58] Field of Search ............... 351/123, 156, 157, 62; 24/3 C; 2/452

[56] References Cited

U.S. PATENT DOCUMENTS

| | | |
|---|---|---|
| 2,654,374 | 10/1953 | Richmond . |
| 3,173,147 | 3/1965 | Gross et al. . |
| 3,874,776 | 4/1975 | Seron . |
| 4,133,604 | 1/1979 | Fuller . |
| 4,541,696 | 9/1985 | Winger et al. . |
| 4,549,793 | 10/1985 | Yoon ..................................... 351/156 |
| 4,696,556 | 9/1987 | Perry, III . |
| 4,712,254 | 12/1987 | Daigle . |
| 4,723,325 | 2/1988 | Perry . |
| 4,793,702 | 12/1988 | Ahrens et al. . |
| 4,918,757 | 4/1990 | Janssen et al. . |
| 5,032,018 | 7/1991 | McCulley et al. ................. 351/156 |

Primary Examiner—William L. Sikes
Assistant Examiner—Hung Xuan Dang
Attorney, Agent, or Firm—Knobbe, Martens, Olson & Bear

[57] ABSTRACT

A dual-function eyeglass retainer/sweatband comprising a central sweatband portion having on each end attached thereto a retainer portion having a tubular end. The sweatband portion is manufactured from a different material than the retainer portions. Preferably the sweatband portion is made from elasticized terrycloth and the retainer portions are made from an elastomeric foam such as neoprene. The present invention provides for tight, loose and storage configurations. A method of transforming the present invention between the loose and tight configurations, including a half-twist, is disclosed. An optional knotted configuration is also disclosed.

15 Claims, 3 Drawing Sheets

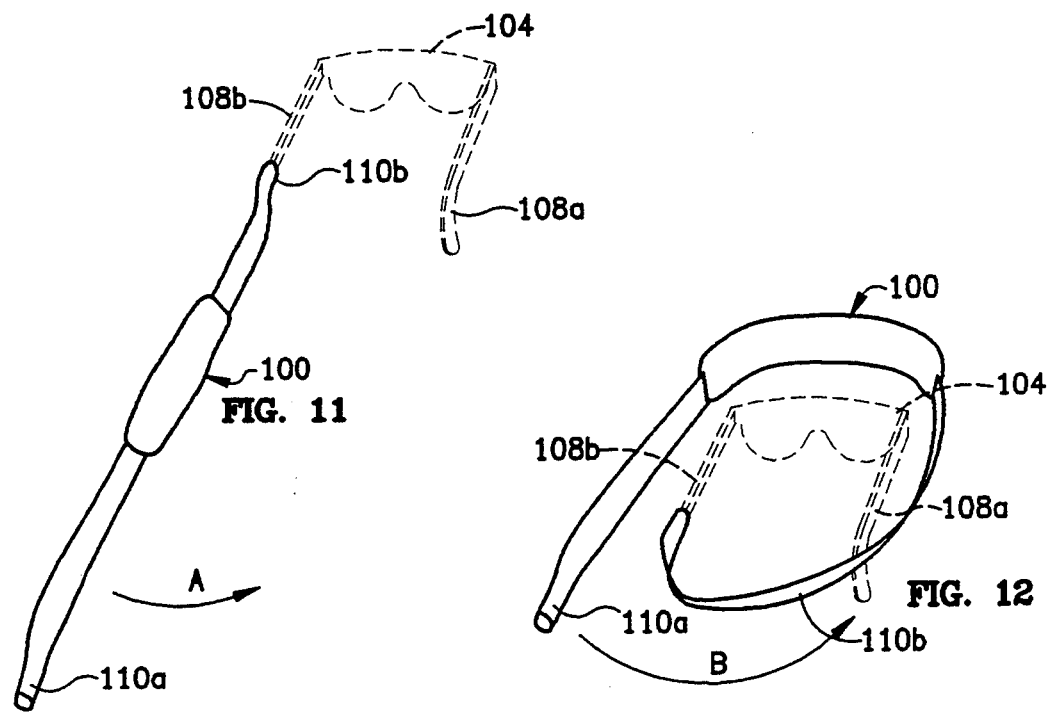
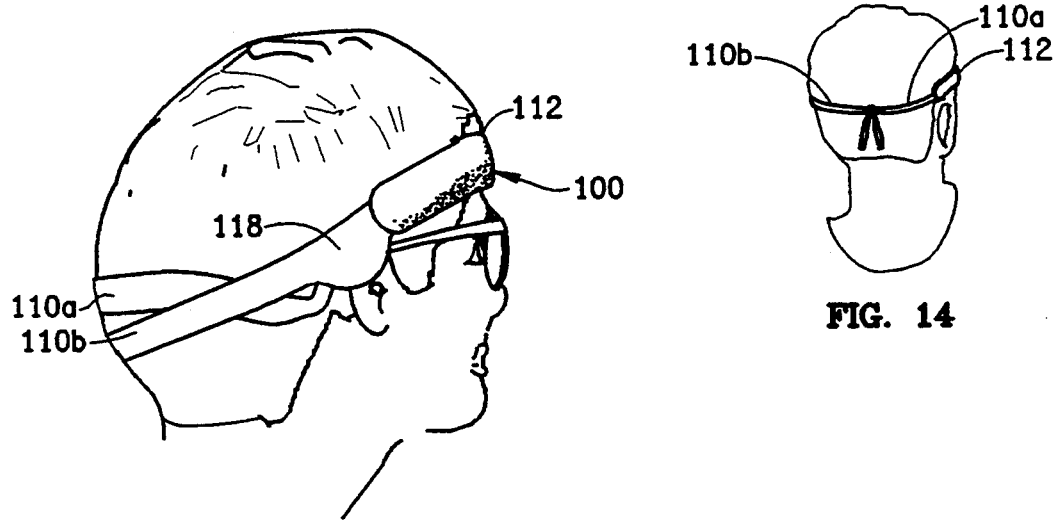

EYEGLASS RETAINER WITH SWEATBAND

This application is a continuation of application Ser. No. 07/664,942, filed Mar. 5, 1991 now abandoned.

BACKGROUND OF THE INVENTION

1. Field of the Invention

The present invention relates to eyewear accessories and, more particularly, to eyeglass retainers.

2. Description of the Prior Art

There are many types of eyewear, including sunglasses, safety glasses, corrective eyeglasses and the like (hereinafter collectively termed "eyeglasses"). As is well known, eyeglasses protect a wearer's eyes from environmental effects such as glare, wind and airborne particles, and/or they compensate for visual defects including, as two prevalent examples, myopia and astigmatism.

In general, eyeglasses are made of a metallic or plastic frame and a pair of glass or plastic lenses. The frame includes three significant parts: a lens piece and two temple pieces. The unitary lens piece holds or supports the lenses in a plane in front of the wearer's eyes. A curved bridge is formed into the lens piece between the frame portions that hold the lenses. The lens piece also has two sides adjacent to the lenses which are each hingeably connected to one of the temple pieces.

The eyeglasses are worn by placing the temple pieces over the ears and positioning the bridge at the top of the wearer's nose. It is well understood by eyeglass wearers that the temple pieces and bridge have a tendency to slide forward down the incline of the nose and, if not checked, the eyeglasses will completely dislodge from the wearer's head. It is thus quite annoying for a wearer to have to constantly push the frame bridge against the nose so as to prevent dislodgement of the eyeglasses. To fill this need, the eyeglass retainer was invented.

An eyeglass retainer is, in most incarnations, a linear strap which in one configuration is designed to retain eyeglasses on a wearer's head. Many eyeglass retainers allow adjustment of the eyeglasses between three nominal configurations on the wearer's body. The eyeglass retainer, or strap, is typically fabricated such that each end of the strap is secured to one of the temple pieces. In a "tight" configuration, the eyeglass retainer forms a yoke against the back of the head that can be tightened so as to maintain the eyeglasses against the wearer's face, i.e., by attaching the strap to the temple pieces at a location that is closer to the lens piece.

In a "loose" configuration, the glasses are held in place on their own, i.e., on the nose and ears, and the eyeglass retainer, still attached to the temple pieces, is allowed to drape down the nape of the wearer's neck. Lastly, in a "storage" configuration, the retainer again rests against the nape. However, in the storage configuration, the glasses are removed from the wearer's head and suspended by the retainer against the wearer's chest.

It will be appreciated by eyeglass wearers that the tight configuration is of greatest benefit when the body is undergoing jarring movements, for example, during athletic activities such as tennis, running and skiing. In such instances, if a retainer is not worn, the eyeglasses quickly loosen and need to be forced back into place. The loose and storage configurations of the eyeglass retainer are perhaps most useful when the wearer is participating in leisure activities. For example, these configurations are advantageous while driving or walking at the beach where changes in the level of outside glare cause a concomitant desire to temporarily wear or store sunglasses.

There are numerous variations of eyeglass retainers performing the same general function. Two of the more popular retainers include an open ended, flexible tube retainer and a retainer having a flat strap connected to tubular ends. The former design is shown in Winger, et al. (U.S. Pat. No. 4,541,696) wherein the preferred eyeglass retainer is manufactured from a tubular elastic knit cord having ends that slide onto the temple pieces of eyeglasses. The patent to Fuller (U.S. Pat. No. 4,133,604) shows an eyeglass retainer of the latter type having tubular members connected by a flat band. The Fuller retainer is said to be preferably fabricated from a closed cell neoprene foam such as that used by the diving industry for wetsuits.

Improvements to linear strap retainers such as the ones disclosed by Winger, et al. and Fuller include the inventions described in Perry, III (U.S. Pat. No. 4,696,556) and Ahrens, et al., (U.S. Pat. No. 4,793,702). The Perry, III patent discloses a retainer wherein each end is turned into itself to form a double wall. The double-walled end is said to be an improvement over a single-walled end because it results in a greater resistance to stretching and a greater gripping force on the temple pieces.

Ahrens, et al., discloses yet another retainer invention that promotes gripping the temple piece. As presented by the inventors, the improved gripping of their retainer invention is a result of combining two materials of differing stretchability. In one embodiment, the retainer band and end tubes are formed from an elastomeric polymer such as neoprene. A retention sheet formed from a less stretchable material (preferably a nylon jersey or tricot) is bonded to the outside of each split end tube which results in a tighter fit on the temple piece than the single material alone.

Besides the aforementioned concerns about retaining eyeglasses, a participant in athletic activities is also interested in mitigating perspiration during periods of physical exertion. Of particular concern, the athletic participant usually perspires quite heavily on the top of the head underneath the hair and on the forehead, causing discomfort and obscuring vision as the sweat droplets gravitate into the participant's eyes. At present, the chief solution to forehead perspiration is to encircle the head with a headband or sweatband, which is typically manufactured from a water absorbent material such as elasticized terrycloth. However, for the athletic participant who wears eyeglasses or sunglasses and who desires maximum comfort, two devices, namely, an eyeglass retainer and a sweatband, must be worn around the head while engaging in physical activity.

A single device performing the dual function of ski goggle retainer and headband for skiers was conceived by Gross, et al., (U.S. Pat. No. 3,173,147). The Gross, et al., patent discloses a headband having receiving loops attached to opposing sides of the headband. The receiving loops engage with slots or hooks which are formed into the frames of custom ski goggles. Unfortunately, besides the obvious limitation to skiing, there are several serious drawbacks to the Gross, et al., invention that prevents widespread consumer appeal.

First, the headband of Gross, et al., requires custom framing apart from the eyeglasses/sunglasses that are normally sold in stores and used by the general public.

Not only is there additional expense in making custom ski goggles or an eyeglass frame, but also such customized frames have limited utility in that they cannot be used for normal wear without the headband, e.g., when the skier is relaxing at a ski resort. Second, even if the Gross, et al., headband would allow a wearer to position the glasses on top of the head, in such a configuration the headband must remain wrapped tightly about the forehead for the slots to engage and retain the goggles. Furthermore, the storage configuration for eyeglass retainers, as previously described, allowing eyewear to be suspended from the wearer's neck and providing a greater degree of comfort, is not an option of the Gross, et al., invention.

Third, the installation and removal of the receiving loops from the slotted frames, as described by Gross, et al., appears awkward and cumbersome when compared to the simple sliding motion on the temple pieces associated with the above-mentioned eyeglass retainers having tubular ends. Lastly, the headwear construction of Gross, et al., requires the headband to be positioned around the wearer's head for glasses to be worn. This requirement lacks the flexibility to provide the loose configuration of an eyeglass retainer wherein the retainer drapes down the nape of the wearer's neck.

Consequently, a need presently exists for a dual function eyeglass retainer/sweatband, which resolves the above mentioned problems. It would be of particular benefit if such an improved eyeglass retainer could be used with standard eyeglasses, i.e., such that it fits on temple pieces. Moreover, a dual-function retainer should permit transitions between three configurations, tight, loose, and storage, so as to be useful in nearly all physical and leisure activities. Such a dual-function retainer invention should be embodied in a single device so that the wearer can participate in physical activity without worrying about dropping eyeglasses or the discomfort of forehead perspiration because one of the two necessary devices is not available.

SUMMARY OF THE INVENTION

The above-mentioned needs are satisfied by the present invention. In one aspect of the present invention an eyeglass retainer, comprises: a sweatband portion formed from a linear segment of a first, flexible material; a pair of retainer portions, each retainer portion comprising: a linear segment of a second, flexible material different from the first material; and first means for attaching at least a part of the lateral edges of the second material so as to form tubular ends; and second means for attaching the retainer portions to each side of the sweatband portion so as to form an integrated linear strip.

In this aspect, the first material is preferably water absorbent. Moreover, the first material is preferably elasticized terrycloth. The second material is preferably an elastomeric foam. Moreover, the elastomeric foam is preferably neoprene. The first attaching means is preferably either heat welding, stitching or glueing. The second attaching means is preferably stitching. Furthermore, each tubular end preferably has a diameter so as to promote gripping a temple piece of a pair of eyeglasses. Also, the sweatband portion is preferably of a size to fit a human forehead.

Another aspect of the present invention is an eyeglass retainer having an integrated sweatband, comprising: a single linear strap having a central sweatband portion made of a first, flexible material joined at each end to a tubular retainer for a temple piece, said retainer made of a second, flexible material which is different from the first material, whereby the dual-function of sweat removal and eyeglass retention is provided.

In another aspect of the present invention, there is an eyeglass retainer, comprising: a sweatband portion formed from a linear segment of a first, flexible material; and a pair of retainer portions, each retainer portion comprising a linear segment of a second, flexible material different from the first material, said linear segment terminating at first and second segment ends, said first segment end of each retainer portion attached to the linear segment of the sweatband portion at opposing ends thereof so as to form an integrated linear strip, said second segment end of each retainer portion having means for selectively attaching the retainer portion to a temple piece of a pair of eyeglasses.

In the above-mentioned aspect of the present invention, each retainer portion may include an ear extension positioned therein so as to cover the ears of a wearer when the eyeglass retainer is worn.

Yet another aspect of the present invention is a method of wearing an eyeglass retainer for simultaneously retaining a pair of eyeglasses and absorbing sweat, wherein the eyeglass retainer comprises a linear strip having a central portion made of a first material combined with end portions made of a second material, the method comprising the steps of: attaching the end portions to the temple pieces of the eyeglasses; twisting the end portions at least a half-twist; and lifting the central portion over the top of the eyeglasses so as to form a tight configuration.

In this method aspect, the steps can be performed while the eyeglasses are positioned on a wearer's head. In addition, the method can additionally comprise the step of placing the tight configuration of eyeglasses and eyeglass retainer on a wearer's head.

Another method aspect of the present invention is a method of mounting a linear eyeglass retainer having a central portion located between two end portions to a pair of eyeglasses having temple pieces, the method comprising the steps of: attaching one end portion of the retainer to one of the temple pieces; looping the other end portion of the retainer so that the end portions overlap; and attaching the other end portion of the retainer to the other temple piece so as to form a tight configuration.

In this method aspect, the steps can be performed while the eyeglasses are positioned on a wearer's head. In addition, the method can additionally comprise the step of placing the tight configuration of eyeglasses and eyeglass retainer on a wearer's head.

These and other objects and features of the present invention will become more fully apparent from the following description and appended claims taken in conjunction with the accompanying drawings.

BRIEF DESCRIPTION OF THE DRAWINGS

FIGS. 11 and 12 are another sequence of perspective views of the preferred eyeglass retainer attached to a pair of eyeglasses, shown in phantom, illustrating the transformation between the single end installed configuration depicted in FIG. 11 and the second intermediate configuration depicted in FIG. 12.

FIG. 13 is a rear perspective view of the eyeglass retainer having ear extensions positioned over the ears of a wearer.

FIG. 14 is a rear perspective view of a person wearing the eyeglass retainer with sweatband as only a headband that is held against the forehead by knotting the ends of the retainer at the back of the head.

DETAILED DESCRIPTION OF THE PREFERRED EMBODIMENTS

Reference is now made to the drawings wherein like numerals refer to like parts throughout.

Figure 1:
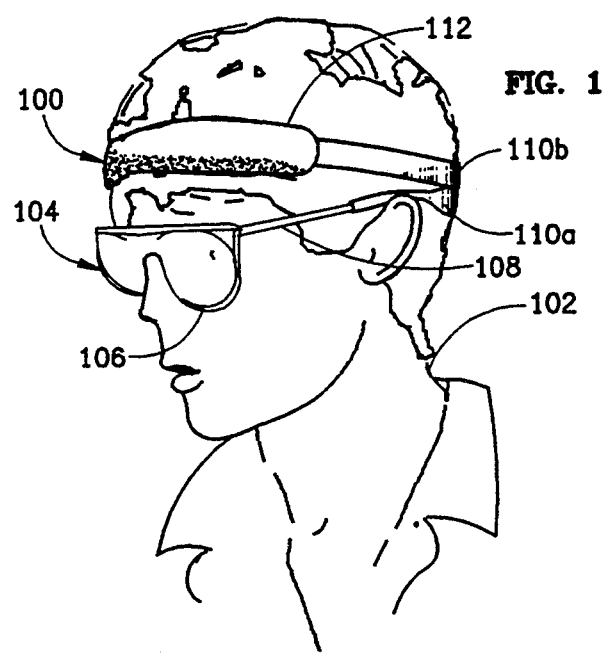
FIG. 1 is a front perspective view, showing the head and neck of a person wearing the preferred eyeglass retainer with sweatband in the tight configuration.

FIG. 1 illustrates the presently preferred embodiment of an eyeglass retainer with sweatband 100, hereinafter referred to as the "eyeglass retainer". In FIG. 1, the eyeglass retainer 100 is shown partially encircling the head of a wearer 102 in what is termed herein a "tight" configuration. The eyeglass retainer 100 is attached to a pair of eyeglasses 104 which may be corrective eyeglasses, sunglasses, safety glasses or the like. The eyeglasses 104 are standard eyewear, having a lens piece connected on each side by a hinge (not shown) to a foldable temple piece 108.

Figure 2:
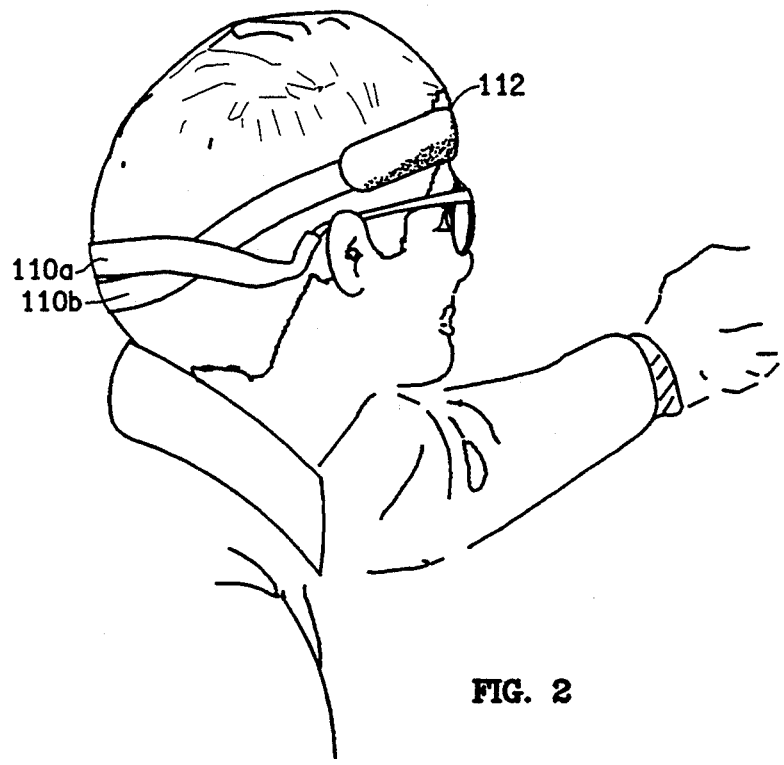
FIG. 2 is a rear perspective view of the eyeglass retainer with sweatband being worn by the person shown in FIG. 1.
Figure 3:
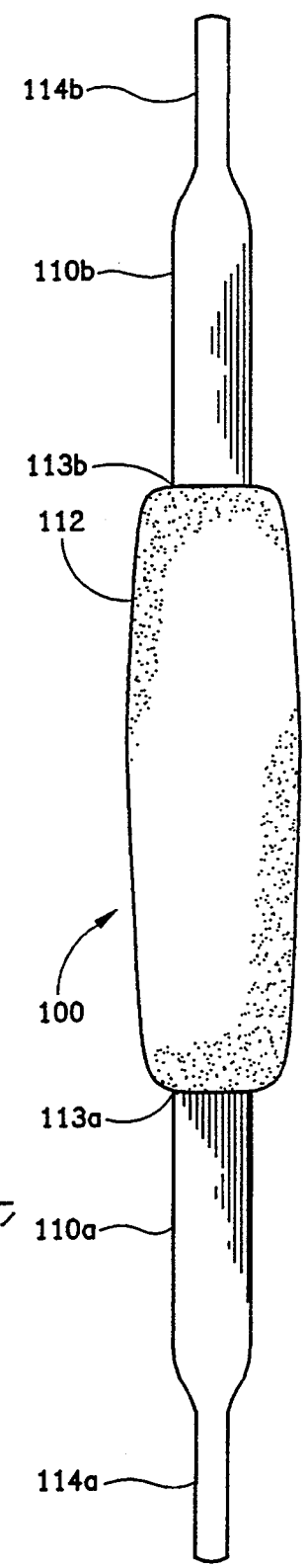
FIG. 3 is a top plan view of the preferred eyeglass retainer with sweatband according to the present invention.

The eyeglass retainer 100 includes a pair of retainer portions 110a, 110b that are attached to a central sweatband portion 112 so as to form the unitary linear strap of the eyeglass retainer 100 (FIG. 3). As is shown in FIG. 2, the two retainer portions 110a, 110b are given a half twist in the back of the wearer's head so that the sweatband portion 112 can be lifted over the top of the head to rest on the forehead of the wearer 102. The half-twist causes one of the retainer portions 110a to cross over the other retainer portion 110b. In general, it is irrelevant as to which retainer portion 110 underlies the other retainer portion 110.

FIG. 3 illustrates a plan view of the eyeglass retainer 100. The retainer portions 110 are preferably fashioned from a flexible, elastomeric material such as a closed or open cell compressible foam. The presently preferred embodiment of the eyeglass retainer 100 uses a neoprene material, such as that popularly used in wetsuits, in the manufacture of the retainer portions 110. The preferred neoprene is available from a number of manufacturers including, for example, Kirkhill Rubber Co. of Brea, Calif. Day-glow colors, such as neon green, may be chosen for the retainer portions 110 to provide the wearer 102 (FIG. 1) with a trendy appearance. Thicknesses for the retainer portions 110 are preferably in the range of about 1/16 inch to 3/16 inch, with ⅛ inch neoprene being chosen for the presently preferred embodiment. Each retainer portion 110 is preferably between 4 and 8 inches in length, with a length of about 6 inches being used for the embodiment shown in the drawings.

In the preferred embodiment, the retainer portions 110 are sewn with cotton thread, for example, onto the ends of the central sweatband portion 112 at stitching locations 113a, 113b thereby forming an integrated, linear retainer strap. The sweatband portion 112 has dimensions of approximately 10 inches in length by 2 inches in width. The total length of the retainer 100 is thus sized to wrap one and one-half times around an average wearer's head (e.g., 6 inches—8 inches). The sweatband portion 112 is formed from a flexible material having greater stretchability than the material used for the retainer portions 110. The sweatband portion 112 is also preferably water absorbent.

As an example of a sweatband material, elasticized terrycloth is presently preferred because it provides sufficient levels of stretchability and water absorbency, the latter parameter being important for removing sweat from the forehead of the wearer 102 (FIG. 1). This elasticized terrycloth material is the same material that is commonly used in headbands and wristbands for athletic purposes. Thus, a key feature of the present invention lies in the combination of two types of materials having different qualities, each material being most suited for its respective function, which together facilitate a dual-function eyeglass retainer/sweatband.

The retainer portions 110 are preferably about ¼ inch to 2 inches in width. Also, a section of each retainer portion 110, located towards the end not attached to the sweatband portion 112, is formed into a tube. These sections of the retainer portions 110 thus form a pair of tubular ends 114a, 114b, which are preferably from about 2½ inches to 12 inches in length. The tubular ends 114 are used to grip the temple pieces 108 of the eyeglasses 104 (FIG. 5).

Figure 4:
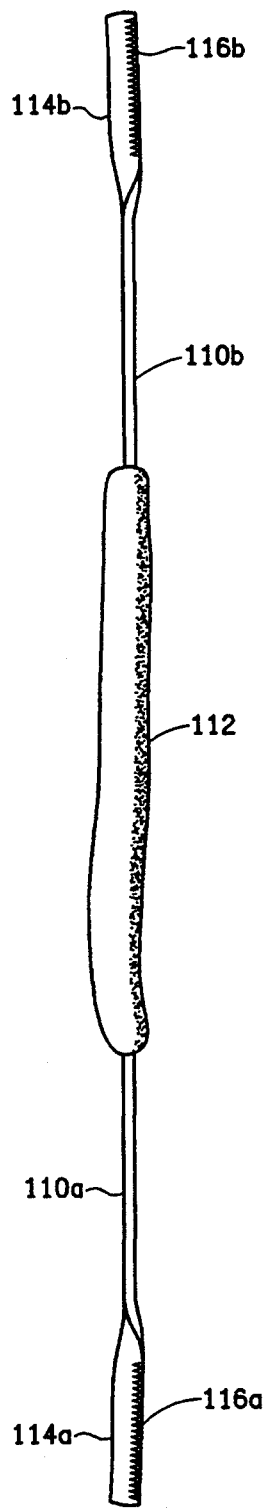
FIG. 4 is a side elevational view of the eyeglass retainer with sweatband shown in FIG. 3.

FIG. 4 is a side elevational view of the preferred eyeglass retainer 100. The tubular ends 114 of the retainer portions 110 are shown to be formed by fastening each section 116a, 116b so as to bind together the longitudinal sides of the retainer portions 110. Due to its strength and economy, stitching with thread is presently preferred for fastening the sections 116. However, it will be understood by those skilled in the relevant area of invention that the present invention includes other means of forming the tubular ends 114 such as, for example, glueing or heat welding (such as the welding performed by Kirkhill Rubber Co., for example).

Figure 5:
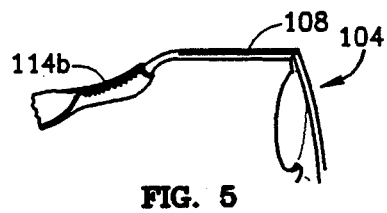
FIG. 5 is a partial perspective view showing one end of the preferred eyeglass retainer attached to a temple piece of a pair of eyeglasses.

FIG. 5 shows one tubular end 114b as it is fit onto the end of a temple piece 108 of the eyeglasses 104. The tubular ends 114 are preferably about ¼ inch in diameter when unstretched, but they will stretch to encompass the earpiece of the temple pieces 108, a cross-sectional dimension of about ⅜ inch. The wearer 102 (FIG. 1) slides or urges the tubular end 114 held in one hand (not shown) onto the end of the temple piece 108 held in the other hand (not shown). The wearer 102 tugs on the retainer portion 110 to remove it from the temple piece 108.

Figure 6:
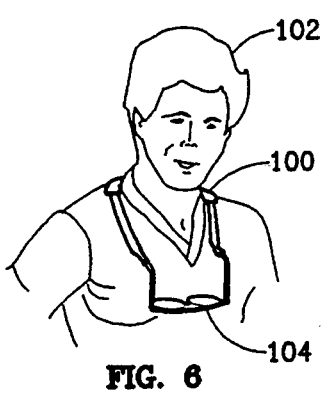
FIG. 6 is a front perspective view of a person wearing the preferred eyeglass retainer in the storage configuration.

As shown in FIG. 6, the eyeglass retainer 100 may be used to simply rest the eyeglasses 104 on the chest of the wearer 102 in a "storage" configuration. Of course, the eyeglass retainer 100 is oftentimes used for athletic activities such as tennis and skiing, but when neither sweat absorbency nor eyeglass retention is desired, the eyeglass retainer 100 worn in the storage configuration is a temporary means for comfortably and safely storing the eyeglasses 104.

Figure 7:
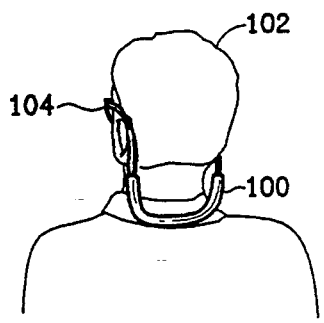
FIG. 7 is a rear perspective view of a person wearing the preferred eyeglass retainer in the loose configuration.

FIG. 7 shows a "loose" configuration of the eyeglass retainer 100 wherein the eyeglass retainer drapes over the nape of the wearer 102. From the loose configuration, shown in FIG. 7, the wearer 102 can transform the eyeglass retainer 100 into the tight configuration, shown in FIGS. 1 and 2. The sequence of steps in this transformation is shown in FIGS. 8, 9, and 10.

Figure 8:
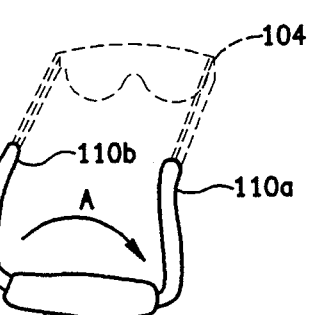
FIGS. 8, 9 and 10 are a sequence of perspective views of the preferred eyeglass retainer attached to a pair of eyeglasses, shown in phantom, illustrating the transformation between the loose configuration depicted in FIG. 8, the first intermediate configuration depicted in FIG. 9, and the tight configuration depicted in FIG. 10.

First, the loose configuration is illustrated in FIG. 8 wherein the eyeglasses 104 (shown in phantom) are attached to the eyeglass retainer 100. The wearer (not shown) gives a half twist to the eyeglass retainer 100 as shown by the arrow labeled "A". The retainer portion 110b is thus crossed over the retainer portion 110a and one face of the sweatband portion 112 is turned down. Thus, the eyeglass retainer 100 enters a first intermediate configuration shown in FIG. 9.

Figure 9:
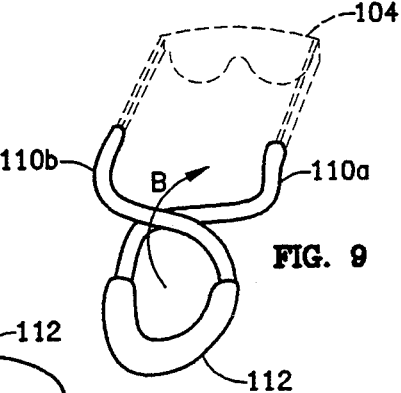
Figure 10:
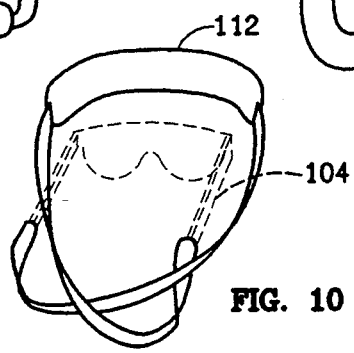

FIG. 9 (the first intermediate configuration of the eyeglass retainer) illustrates the movement required by the wearer, indicated by the arrow labeled "B", which brings the sweatband portion 112 from around the back of the neck into position against the wearer's forehead. One of ordinary skill in the relevant field will recognize that any integer multiple of half twists will accomplish the desired result. In general, the wearer grasps both retainer portions 110a and 110b for this movement. The wearer then adjusts the sweatband portion 112 on the forehead above the eyes so as to maximize sweat absorbency and comfort as shown, for example, in FIG. 10. Thus, the first intermediate configuration is entered in the sequence from the loose configuration (FIG. 8) and exited in the sequence in the tight configuration (FIG. 10).

Of course the transformation just described can be performed in one continuous motion without the need for any discrete steps exemplified by the first intermediate configuration shown in FIG. 9. Furthermore, the transformation thus described need not necessarily occur while the eyeglass retainer 100 is worn. Instead, the transformation can first occur and the eyeglasses 104 and eyeglass retainer 100 can then be positioned on the wearer's head as a final step. The reverse sequence of steps, i.e., moving progressively from FIG. 10 to FIG. 9 to FIG. 8, permits the wearer to transform the eyeglass retainer 100 from the tight configuration into the loose configuration.

FIGS. 11 and 12, taken in conjunction with FIG. 10, are illustrative of another method of mounting the eyeglass retainer 100 on the eyeglasses 104. The sequence of steps carried out in this transformation would follow FIGS. 11, 12 and 10 which show, respectively, a single end installed configuration, a second intermediate configuration, and the tight configuration.

In the single end installed configuration of FIG. 11, the retainer portion 110b is first installed on one of the temple pieces, here identified by reference numeral 108b. Following the arrow labeled "A" the other retainer portion 110a is looped across the retainer portion 110b so as to overlap. The eyeglass retainer 100 is thus placed in the second intermediate configuration as shown in FIG. 12.

From the second intermediate configuration (FIG. 12), the retainer portion 110a is made to follow the path indicated by the arrow labeled "B". As a final step, the retainer portion 110a is attached to the other temple piece, specifically indicated as 108a, on the eyeglasses 104. This step placed the eyeglass retainer 100 in the tight configuration as shown in FIG. 10.

As noted with respect to the first transformation shown and described (FIGS. 8, 9 and 10), this latter transformation is normally a continuous motion. Furthermore, the transformation of FIGS. 11, 12 and 10 can occur either on or off of the wearer's head. Of course, the method is not restricted as to which retainer portion 110 is first installed. Lastly, the reverse sequence of steps may be employed to remove the eyeglass retainer 100 from the eyeglasses 104.

FIG. 13 shows another embodiment of the present invention, wherein each retainer portion 110 has an ear extension 118. (The ear extension on the retainer portion 110a is not shown.) The ear extensions 118 are defined by flaring or enlarging the retainer portions 110 in the width direction. As shown in FIG. 13, the ear extensions 118 are positioned on the retainer portions 110 so as to cover the ears of a wearer when the eyeglass retainer 100 is worn. Thus, the ear extensions 118 protect the wearer's ears in cold weather such as may be encountered when skiing. As an alternative means of covering the wearer's ears (not shown), the length of the sweatband portion 112 can be increased to extend beyond the forehead, and over the wearer's ears.

FIG. 14 shows yet another configuration of the present invention. As shown in FIG. 14, the eyeglass retainer 100 may include retainer portions 110 which are of such a length as to allow the portions to be knotted together. Such length is preferably between approximately 4 inches and 16 inches. When a skier, for example, no longer has a need for the retainer function of the eyeglass retainer 100, but still desires sweat absorbency provided by the present invention, the sweatband portion 112 is placed on the wearer's forehead and the retainer portions 110 are knotted together at the back of the wearer's head in a "knotted" configuration. To remove the retainer 100, the retainer portions 110 are unknotted.

Thus, the present invention combines two different types of flexible materials in a linear strip to thereby provide a dual-function, integrated eyeglass retainer/sweatband. The use of elasticized terrycloth as a central sweatband portion, for example, provides the requisite degree of flexibility, stretchability and water absorbency. Such a sweat absorbency function is not found in an eyeglass retainer made entirely from foam, as are the vast majority of eyeglass retainers now commercially available and previously disclosed. The dual-function eyeglass retainer with sweatband is portable, comfortable to wear, lightweight, and inexpensive to manufacture.

While the above detailed description has shown, described, and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. An eyeglass retainer for a wearer of eyeglasses, comprising:
   a sweatband portion formed from a linear segment of a first, water absorbent, flexible material having a first and a second end; and a first and second retainer portion respectively attached to said first and said second ends of said sweatband portion thereby forming an integrated linear strip, each retainer portion comprising:

a linear segment of a second, flexible material, different from the first material, having a first and a second lateral edge; and means for attaching at least a part of the first lateral edge to the second lateral edge thereby forming a tubular end suitable for attachment to a temple piece of eyeglasses;

wherein the integrated linear strip is dimensioned to encircle the wearer's head when the tubular ends are operatively engaged with the eyeglass temple pieces and the sweatband portion is positioned on the wearer's forehead so that retention of the eyeglasses on the face of the wearer results from the first and second retainer portions pulling on the first and second ends of the sweatband portion respectively.

2. The eyeglass retainer defined in claim 1, wherein the first material is elasticized terrycloth.

3. The eyeglass retainer defined in claim 1, wherein the second material is an elastomeric foam.

4. The eyeglass retainer defined in claim 3, wherein the elastomeric foam is neoprene.

5. The eyeglass retainer defined in claim 1, wherein the first attaching means is heat welding.

6. The eyeglass retainer defined in claim 1, wherein the first attaching means is stitching.

7. The eyeglass retainer defined in claim 1, wherein the first attaching means is glueing.

8. The eyeglass retainer defined in claim 1, wherein the second attaching means is stitching.

9. The eyeglass retainer defined in claim 1, wherein each tubular end has a diameter so as to promote gripping a temple piece of a pair of eyeglasses.

10. The eyeglass retainer defined in claim 1, wherein the sweatband portion is of a size to fit a human forehead.

11. An eyeglass retainer, for a wearer of eyeglasses, having an integrated sweatband, comprising:

a single linear strap having a central sweatband portion made of a first, flexible material joined at each end to a tubular retainer for a temple piece, said retainer made of a second, flexible material which is different from the first material, wherein the single linear strap is dimensioned to encircle a wearer's head when the tubular retainers are operatively engaged with the temple pieces and the central sweatband portion is positioned on the wearer's forehead so that retention of the eyeglasses on the face of the wearer results from each of the tubular retainers respectively pulling on each end of the central sweatband portion.

12. An eyeglass retainer for a wearer of eyeglasses, comprising:

a sweatband portion formed from a linear segment of a first, water absorbent, flexible material; and a pair of retainer portions, each retainer portion comprising a linear segment of a second, flexible material different from the first material, said linear segment terminating at first and second segment ends, said first segment end of each retainer portion attached to the linear segment of the sweatband portion at opposing ends thereof so as to form an integrated linear strip, said second segment end of each retainer portion having means for selectively attaching the retainer portion to a temple piece of a pair of eyeglasses, wherein the integrated linear strip is dimensioned to encircle a wearer's head when the retainers portions are operably engaged with the temple pieces and the sweatband portion is positioned on the wearer's forehead, so that retention of the eyeglasses on the face of the wearer results from the pair of retainer portions respectively pulling on the opposing ends of the sweatband portion.

13. The eyeglass retainer as defined in claim 12, wherein each retainer portion includes an ear extension positioned therein so as to cover the ears of a wearer when the eyeglass retainer is worn.

14. A method of wearing an eyeglass retainer for simultaneously retaining a pair of eyeglasses on the face of a wearer and absorbing sweat, wherein the eyeglass retainer comprises a linear strip having a central portion made of a first water absorbent material combined with end portions made of a second material, the method comprising the steps of:

attaching the end portions of the eyeglass retainer to the temple pieces of the eyeglasses;

placing the eyeglasses on the face of the wearer;

twisting the center portion of the eyeglass retainer relative to the eyeglasses at least a halftwist; and positioning the central portion on the wearer's forehead so as to form a tight configuration wherein retention of the eyeglasses on the face of the wearer results from the end portions pulling on the central portion of the eyeglass retainer.

15. A method of mounting a linear eyeglass retainer having a central, water absorbent portion located between two end portions to a pair of eyeglasses having temple pieces for a wearer of the eyeglasses, the method comprising the steps of:

attaching one end portion of the retainer to one of the temple pieces;

looping the other end portion of the retainer so that the end portions overlap;

attaching the other end portion of the retainer to the other temple piece;

placing the eyeglasses on the face of the wearer; and positioning the central portion of the retainer on the wearer's forehead so as to form a tight configuration wherein retention of the eyeglasses on the face of the wearer results from the end portions pulling on the central portion of eyeglass retainer.

* * * * *